United States Patent [19]
Schupbach et al.

[11] Patent Number: 5,766,292
[45] Date of Patent: Jun. 16, 1998

[54] METHOD AND APPARATUS FOR MAKING WIDE MOUTH HOLLOW GLASS ARTICLES

[75] Inventors: Donald E. Schupbach, Alton, Ill.; D. Wayne Leidy, Perrysburg, Ohio

[73] Assignee: Owens-Brockway Glass Container Inc., Toledo, Ohio

[21] Appl. No.: 722,921

[22] Filed: Sep. 23, 1996

[51] Int. Cl.⁶ ............................................. C03B 9/00
[52] U.S. Cl. .................... 65/68; 65/72; 65/76; 65/79; 65/82; 65/163; 65/229; 65/260
[58] Field of Search ........................... 65/29.1, 29.11, 65/68, 76, 72, 79, 80, 82, 110, 163, 207, 223, 226, 227, 229, 261, 260

[56] References Cited

U.S. PATENT DOCUMENTS

| | | |
|---|---|---|
| 1,843,159 | 2/1932 | Ingle . |
| 1,992,951 | 3/1935 | Howard . |
| 2,059,147 | 10/1936 | Rowe . |
| 2,094,626 | 10/1937 | Tremblay . |
| 2,864,124 | 12/1958 | Strauss ................................ 65/229 |
| 3,147,102 | 9/1964 | Trudeau . |
| 3,198,617 | 8/1965 | Denman et al. . |
| 3,216,813 | 11/1965 | Mumford ............................ 65/229 |
| 3,434,820 | 3/1969 | Zappia et al. . |
| 3,841,859 | 10/1974 | Becker et al. . |
| 4,009,016 | 2/1977 | Foster . |
| 4,009,019 | 2/1977 | Foster . |
| 4,010,021 | 3/1977 | Foster . |
| 4,046,550 | 9/1977 | Thyoux . |
| 4,058,388 | 11/1977 | Zappia ................................ 65/229 |
| 4,162,911 | 7/1979 | Mallory ............................... 65/229 |
| 4,200,449 | 4/1980 | Martin . |
| 4,244,726 | 1/1981 | Northup . |
| 4,255,179 | 3/1981 | Foster . |
| 4,680,050 | 7/1987 | Doud . |

*Primary Examiner*—Steven P. Griffin

[57] ABSTRACT

A method and apparatus for forming a hollow glass article comprises delivering a gob of glass to a blank mold, providing a first neck ring to a position adjacent the blank mold, forming the gob in the blank mold into a parison, moving the first neck ring to transfer the parison to a blow mold, blowing the parison in the blow mold to a hollow article, releasing the engagement of the first ring with the hollow article, moving the first neck ring away from the blow mold, removing the hollow article from the blow mold, returning the first neck ring to a position adjacent the blank mold to repeat the cycle, providing a second neck ring adjacent the blank mold while the first ring is moving toward the blow mold, delivering a second gob of glass to the blank mold while the second ring is in position adjacent the blank mold, forming the second gob into a second parison, moving the second parison to a position adjacent the blow mold while the first neck ring is being returned to a position adjacent said blank mold; and controlling the positioning and movement of the first neck ring and second ring independently of one another such that the velocity and movement of each neck ring is varied without affecting the overall forming cycle.

15 Claims, 7 Drawing Sheets

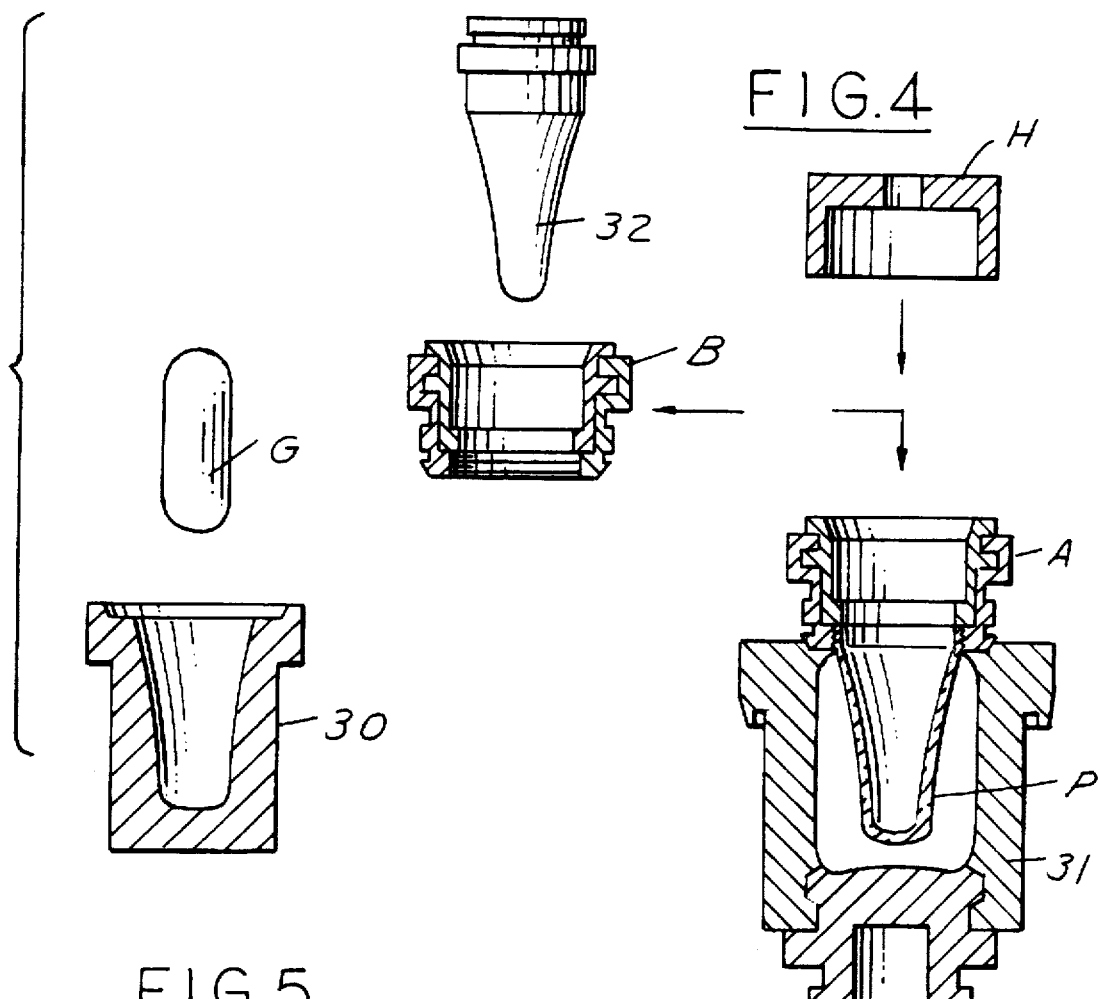
FIG.4
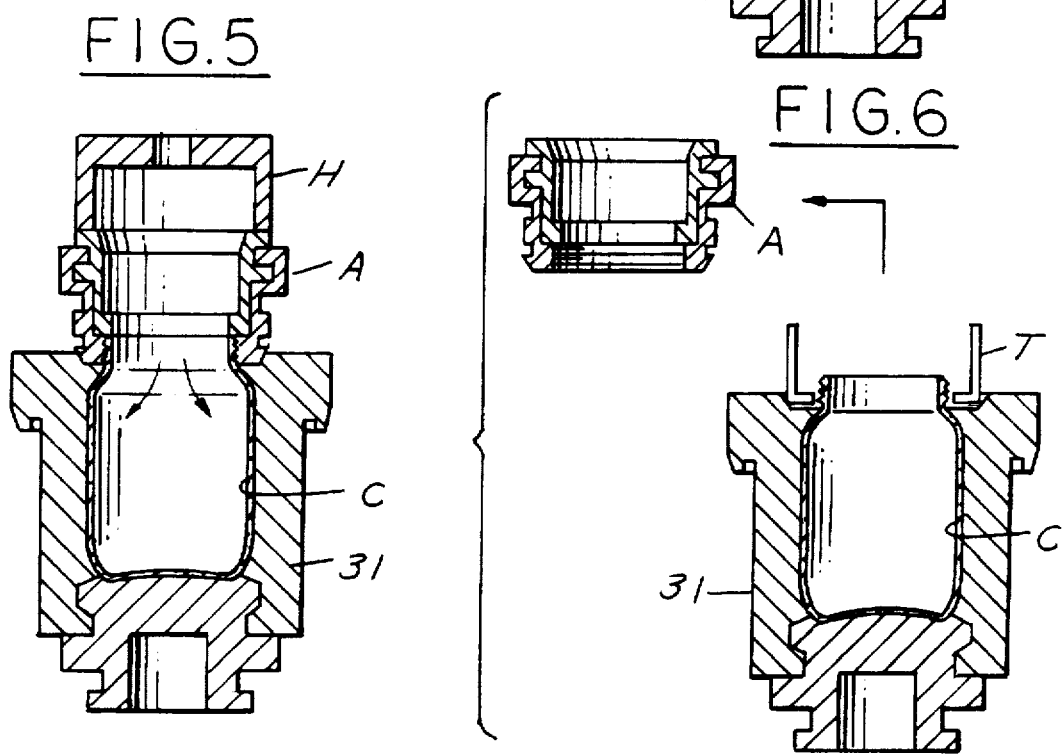
FIG.5
FIG.6

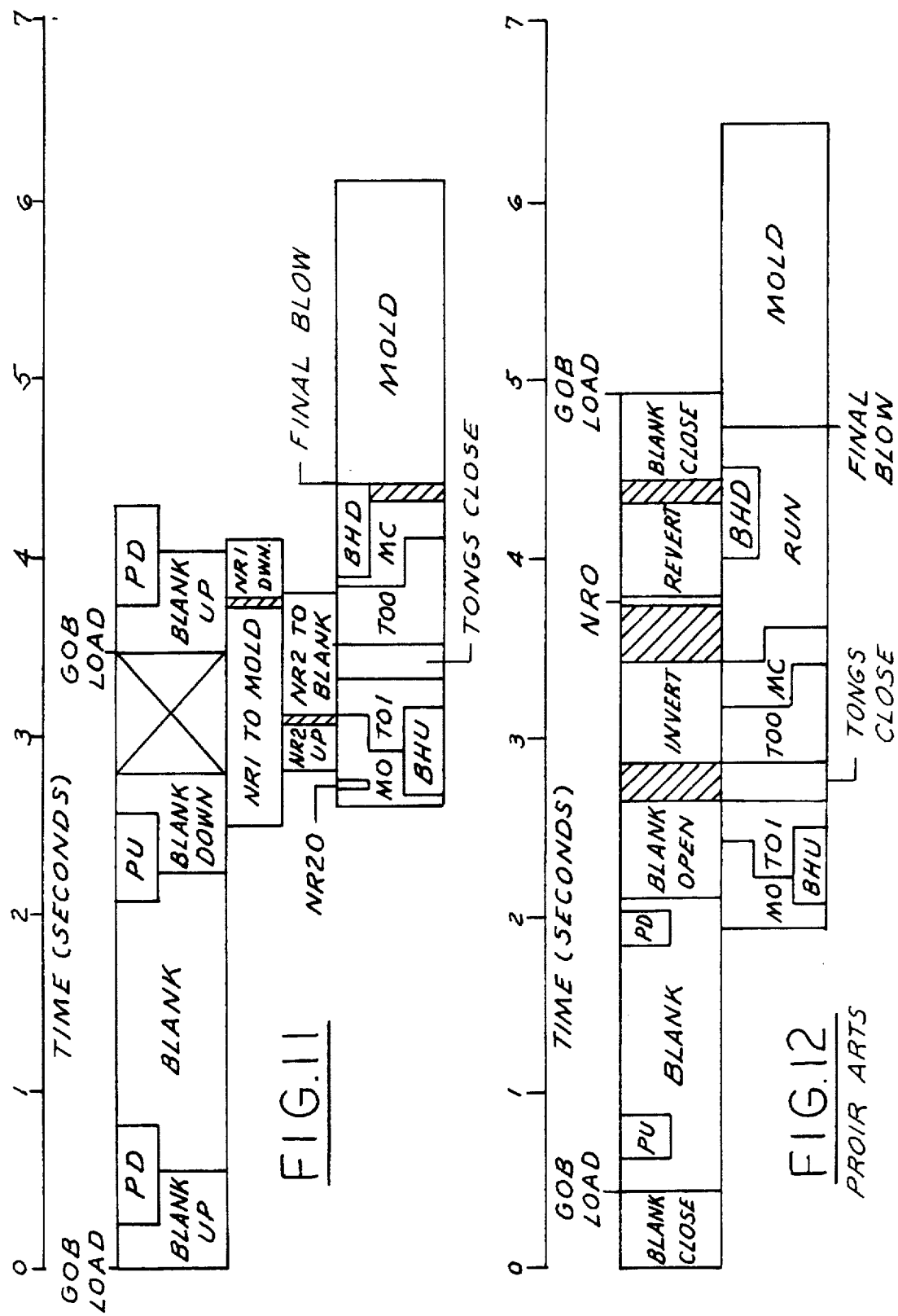

5,766,292

1

METHOD AND APPARATUS FOR MAKING WIDE MOUTH HOLLOW GLASS ARTICLES

This invention relates to a method and apparatus for making wide mouth hollow glass articles.

BACKGROUND AND SUMMARY OF THE INVENTION

Commercial glass container forming processes employ two stages: (1) a blank mold to form a preliminary shape called a parison from a gob, and (2) a finish or blow mold, where the parison is expanded with compressed air to conform to the cavity shape. Various patents have been directed to utilizing plural neck rings and plural molds in an effort to increasing the efficiency, as shown in U.S. Pat. Nos. 3,198,617 and 3,434,820.

These patents disclose processes that are similar. Both utilize three coupled neck rings to transfer the glass between stations. The rings move simultaneously at the same velocity. U.S. Pat. No. 3,434,820 discloses a chain operated neck ring carrier, while U.S. Pat. No. 3,198,617 mounts the rings on a rotary turret. U.S. Pat. No. 3,434,820 delivers the gob to the blank, then moves the blank mold under the neck ring and plunger, while U.S. Pat. No. 3,198,617 loads the blank mold through the neck ring and moves the plunger into pressing position above the ring. U.S. Pat. No. 3,434,820 opens the ring to deposit the formed container on the dead plate or conveyor with the carrier in motion, while U.S. Pat. No. 3,198,617 opens the ring after the rotary turret index portion has been completed.

The blank mold pulls away from the formed parison as the plunger retracts. When the blank mold clears the parison and the plunger clears the first neck ring, the ring transfers the parison to the blow mold. For an efficient operation, the parison reaches the blow mold just as it is closing. Before the take out mechanism can remove the bottle from the blow mold, the blow head must be retracted and the mold must be partially open, and it must remain open until the container clears. The second ring must arrive at the pressing position before the blank mold moves into pressing position. The cavity rate can be increased by reducing the neck ring transfer times. (Speed, or cavity rate, in units per cavity per minute is equal to 60 divided by the blank or mold cycle time in seconds. The blank and mold cycle times are equal).

Among the objectives of the present invention are to provide a method and apparatus for making wide mouth hollow glass articles wherein the productivity and process stability is increased while using comparable forming times and mechanism times; which maintain required glass contact times and mechanism times, while reducing the blank mold and blow mold cycle times and increasing parison transfer time; wherein the finish is held in the neck ring until the blow mold opens to prevent the container from pulling to one side and causing checks in bottom and/or base of neck; wherein machine speed is increased by using two neck rings to minimize parison transfer and reheat time appearing in the blank mold and blow mold cycles; wherein the blank and mold cycle times are equal; wherein the total parison reheat time can also be decreased while maintaining sufficient parison elongation; and wherein the blow mold can be located under the blank mold without altering the basic method.

In accordance with the invention, the method of forming a hollow glass article comprises delivering a gob of glass to a blank mold, providing a first neck ring to a position adjacent the blank mold, forming the gob in the blank mold into a parison, moving the first neck ring to transfer the parison to a blow mold, blowing the parison in the blow mold to form a hollow article, releasing the engagement of the first ring relative to the blow mold with the hollow article, moving the first neck ring away from the blow mold, removing the hollow article from the blow mold, returning the first neck ring to a position adjacent the blank mold to repeat the cycle, providing a second neck ring adjacent the blank mold while the first ring is moving toward the blow mold, delivering a second gob of glass to the blank mold while the second ring is in position adjacent the blank mold, forming the second gob into a second parison, moving the second parison to a position adjacent the blow mold while the first neck ring is being returned to a position adjacent said blank mold; and controlling the positioning and movement of the first neck ring and second ring independently of one another such that the velocity and movement of each neck ring is varied without affecting the overall forming cycle.

An apparatus for forming a hollow glass article embodying the invention comprises a blank mold, a blow mold, means for delivering a gob of glass to a blank mold, a first neck ring, means for moving said first mold between a position adjacent the blank mold and a position adjacent a blow mold, means for forming a gob in the blank mold into a parison, a second neck ring adjacent the blank mold, means for moving the second ring between a position adjacent the blank mold and a position adjacent the blow mold, means for removing a hollow article from the blow mold, each said means for moving said first ring and means for moving said second ring being controlled independently of the other such that the velocity and movement of each neck ring is varied without affecting the overall forming cycle and such that the reheat and transfer time of each neck ring is controlled independently of the other neck ring.

The cycle of the present invention utilizes two independently operated neck rings, with a conventional take out mechanism. Since the rings have individual operating mechanisms, they can start and stop independently and move at different velocities. This allows more flexibility in the process, since the reheat and run time can be varied without affecting the machine speed. After the blank and plunger are clear, the first ring transfers the parison to the blow mold. When the blow head retracts, the second ring releases the container and the mold opens. Then, the second ring moves to the pressing station and the take out removes the formed container from the mold. The mold cannot close until the bottle clears and the first ring arrives with the parison, and the blank mold cannot move up until the second ring is in pressing position.

DESCRIPTION OF THE DRAWINGS

FIGS. 1 through 6 are partly schematic sectional views showing the sequence of operations for the method and apparatus embodying the invention.

FIG. 11 is a forming cycle of an apparatus embodying the invention.

FIG. 12 is a forming cycle of a prior art I.S. apparatus.

DESCRIPTION OF THE PREFERRED EMBODIMENT

In accordance with the invention, the method of forming a hollow glass article comprises delivering a gob of glass to a blank mold, providing a first neck ring in a position adjacent the blank mold, forming the gob in the blank mold into a parison, moving the first neck ring to transfer the parison to a blow mold, blowing the parison in the blow mold to a hollow article, releasing the engagement of the first ring with the hollow article, moving the first neck ring away from the blow mold, removing the hollow article from the blow mold, returning the first neck ring to a position adjacent the blank mold to repeat the cycle, providing a second neck ring adjacent the blank mold while the first ring is moving toward the blow mold, delivering a second gob of glass to the blank mold while the second ring is in position adjacent the blank mold, forming the second gob into a second parison, moving the second parison to a position adjacent the blow mold while the first neck ring is being returned to a position adjacent said blank mold; and controlling the positioning and movement of the first neck ring and second ring independently of one another such that the velocity and movement of each neck ring is varied without affecting the overall forming cycle.

An apparatus for forming a hollow glass article embodying the invention comprises a blank mold, a blow mold, means for delivering a gob of glass to a blank mold, a first neck ring, means for moving said first mold between a position adjacent the blank mold and a position adjacent a blow mold, means for forming a gob in the blank mold into a parison, a second neck ring adjacent the blank mold, means for moving the second ring between a position adjacent the blank mold and a position adjacent the blow mold, means for removing a hollow article from the blow mold, each said means for moving said first ring and means for moving said second ring being controlled independently of the other such that the velocity and movement of each neck ring is varied without affecting the overall forming cycle and such that the reheat and transfer time of each neck ring is controlled independently of the other neck ring.

Referring to FIGS. 1–6, which diagrammatically show the method, the method comprises the use of a blank mold 30 and a sectional blow mold 31, a plunger 32, as in conventional I.S. glass forming machines, and two sectional neck rings A, B. The blank mold 30 and blow mold 31 may be single cavity or multiple cavity.

The description of the present invention applies to a top loading, upright, one piece press-and-blow blank mold, but other variations are possible such as the use of a segmented mold. Multiple cavity operation is contemplated.

Figure 1:
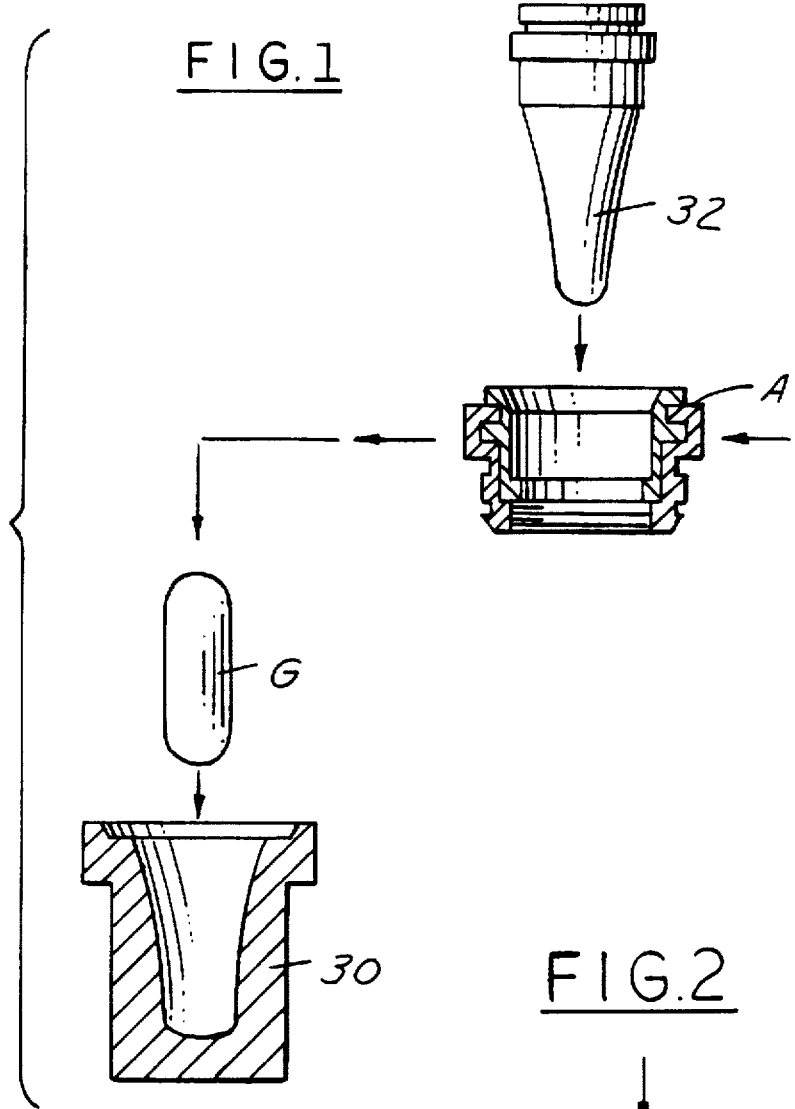

The steps of the method are summarized as follows:

FIG. 1: A glass gob G is loaded into the blank mold while neck ring "A" is in the press position, or is moving into press position, and the plunger 32 is retracted.

Figure 2:
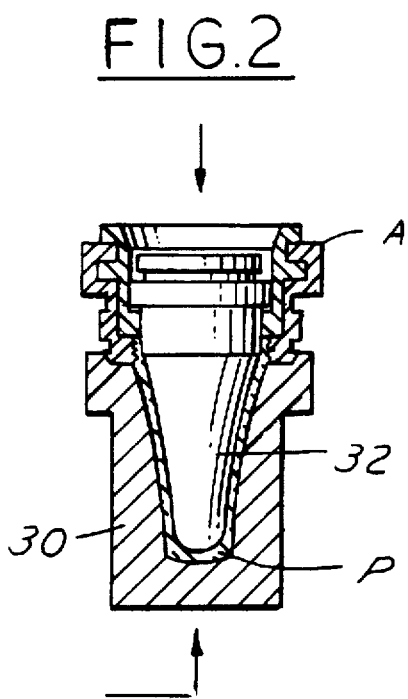

FIG. 2: The blank mold 30 moves relatively upward to engage the neck ring "A", and the plunger 32 is extended downward through the ring "A" to press the gob G into a parison P.

Figure 3:
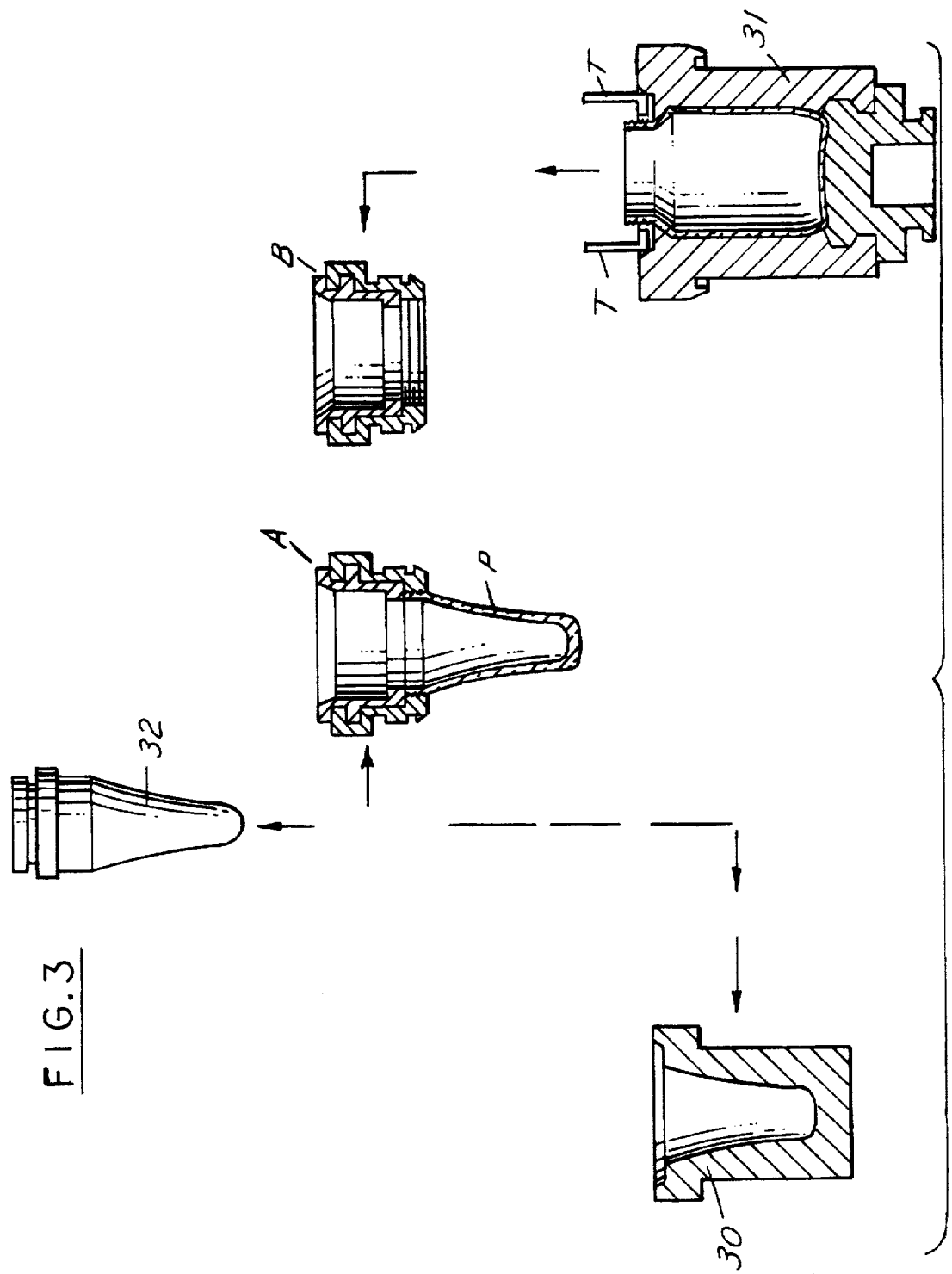

FIG. 3: The blank mold 30 pulls relatively away from the parison P on the neck ring A and moves to a loading position as the plunger 32 is retracted. When the blank mold 30 clears the formed parison P and the plunger 32 clears neck ring "A", the ring "A" moves toward the blow mold 31. Neck ring "B" releases the previous container after the mold 31 starts to open and neck ring "B" moves toward the press position before the take out tongs T move in to remove the container from the blow mold 31.

FIG. 4: Neck ring "B" moves into the press position as the next gob G is loaded into the blank mold 30. Neck ring "A" with the parison P therein lowers to the final blow position as the blow mold 31 closes and the blow head H moves in. The parison P reheats and elongates from the time the blank retracts until final blow air is applied.

FIG. 5: Compressed air is applied through the neck ring "A" to expand the parison P and form a container C.

FIG. 6: Neck ring "A" releases the finish after the blow mold 31 starts to open. Finally, neck ring "A" clears the mold before the take out tong T moves in to engage the finish, and neck ring "A" shifts to the press position to repeat the cycle. The container C is transferred to the dead plate for additional cooling.

Referring to FIGS. 7, 8, 9A, 9B and 10 the method is shown as applicable to an apparatus with multiple cavities wherein corresponding parts have been indicated with the suffix "a".

Figure 7:
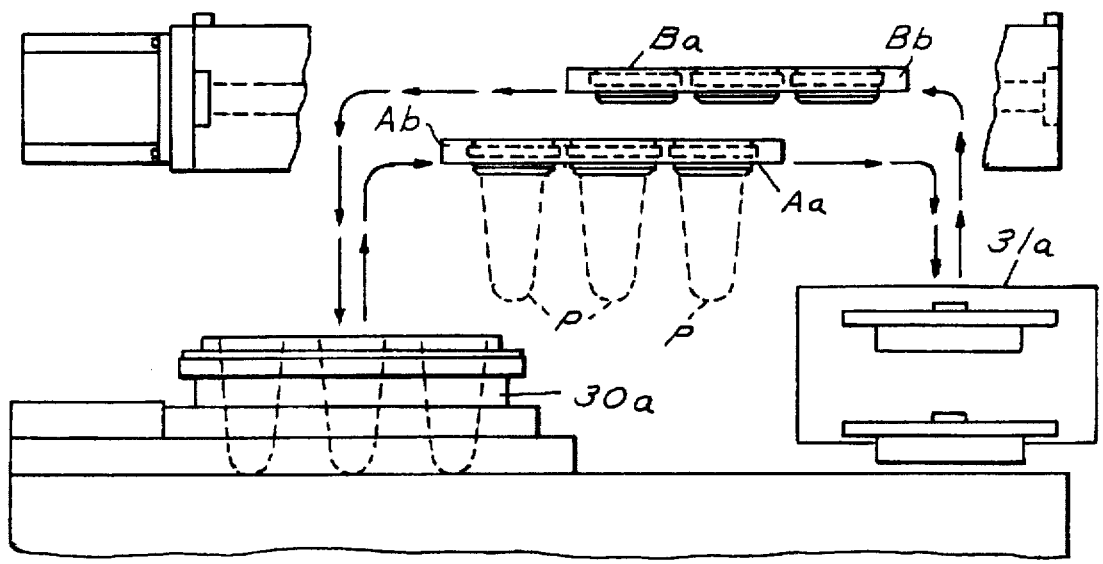
FIG. 7 is a fragmentary elevational view of a multiple cavity apparatus embodying the invention.
Figure 8:
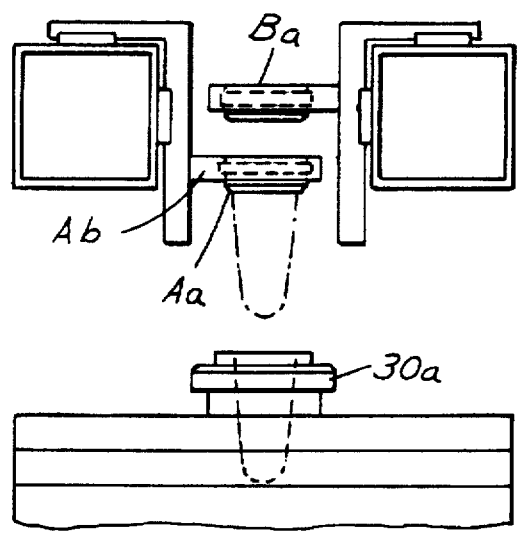
FIG. 8 is an end view of the apparatus shown in FIG. 7.
Figure 9A:
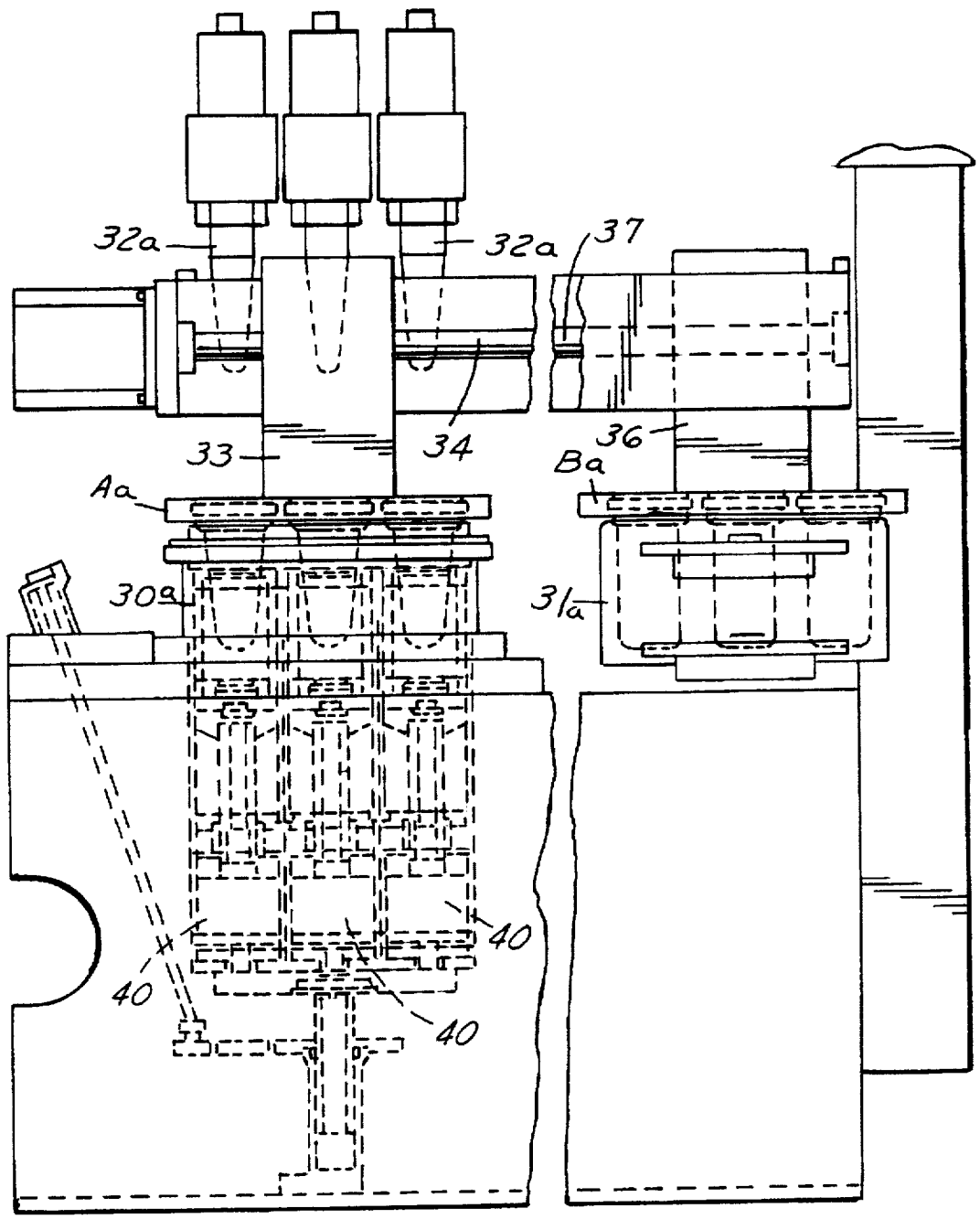
FIGS. 9A and 9B are elevational views of the apparatus in different operative positions.
Figure 9B:
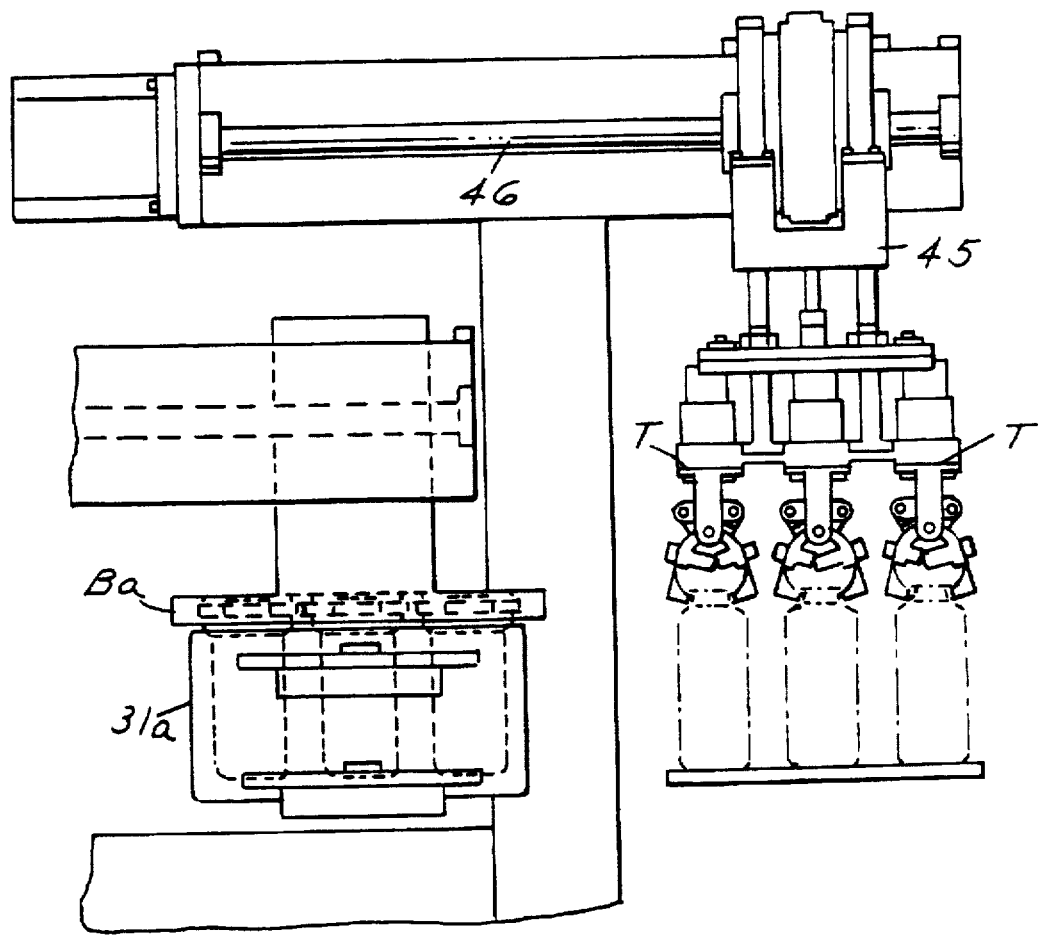
Figure 10:
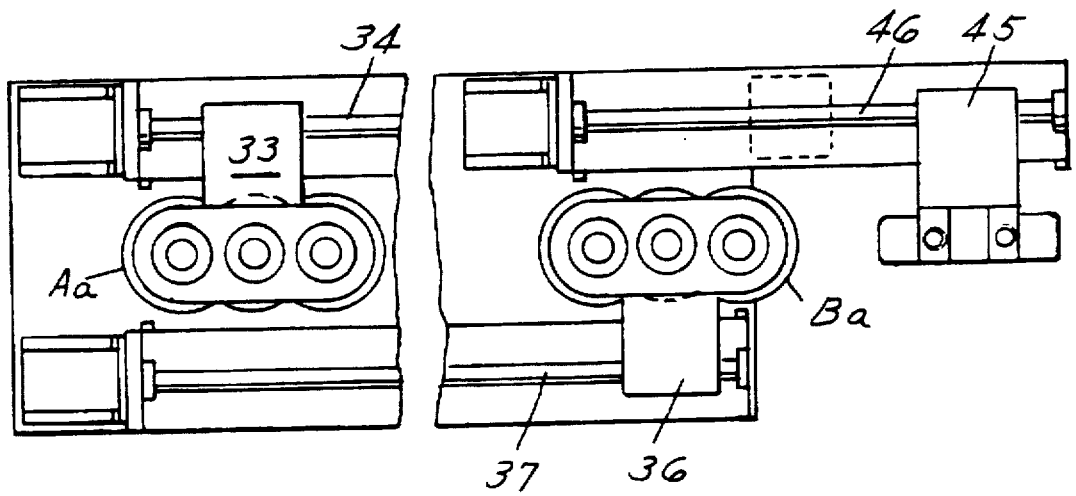
FIG. 10 is a plan view of a portion of the apparatus shown in FIGS. 7, 8, 9A, 9B.

FIGS. 7, 8, 9A and 9B show apparatus which can be used to perform the method and make multiple containers in each cycle. As shown in FIG. 7, previously formed multiple parisons P are being transferred from multiple cavity parison mold 30a by multiple neck rings Aa to the multiple cavity blow mold 31a. During this transfer, multiple neck rings Ba are being returned into position adjacent the blank mold 30a after having released previously formed containers at the blow molds 31a. As further shown in FIGS. 9A, 9B and 10, multiple neck rings Aa are provided on a first shuttle Ab movable on a slide 34 by an elevated servo driven mechanism. Similarly, multiple neck rings Ba are provided on a second shuttle Bb movable on a slide 37 by a servo. At the parison forming station, cylinders 40 move the multicavity parison molds 30a upwardly into position for pressing the parisons P by plungers 32a and downwardly out of position to permit shunting of the neck rings Aa, Ba. Similarly, the blow molds 31a are moved vertically into and out of position by cylinders. As shown in FIGS. 7 and 8, the neck rings Aa, Ba move only horizontally and the parison molds 30a and blow molds 31a move upwardly into and out of position with respect to the neck rings Aa, Ba. Tongs T are similarly mounted on a shuttle 45 movable on a slide 46 by a servo mechanism.

The cycle of the present invention utilizes two independently operated neck rings, with a conventional take out mechanism to remove the bottle from the mold. Since the rings have individual operating mechanisms, they can start and stop independently and move at different velocities. This allows more flexibility in the process, since the reheat and run time can be varied without affecting the machine speed. After the blank and plunger are clear, the first ring transfers the parison to the blow mold. When the blow head retracts, the second ring releases the container and the mold opens. Then, the second ring moves to the pressing station and the take out removes the formed container from the mold. The mold cannot close until the bottle clears and the first ring arrives with the parison, and the blank mold cannot move up until the second ring is in pressing position.

Referring to FIGS. 11 and 12, the forming or timing cycle of a wide mouth glass container forming apparatus embodying the invention is shown in FIG. 11 and the forming or timing cycle of a prior art wide mouth glass container forming apparatus, known as an I.S., is shown in FIG. 12. In these diagrams, the definitions are as follows:

PD-Plunger down
PU-Plunger up
MO-Mold open
MC-Mold close
BHU-Blow head up
BHD-Blow head down
TOI-Take out in
TOO-Take out out
NRO-Neck ring open
NR1-First neck ring
NR2-Second neck ring
NR20-Second neck ring open It can be seen that the timing cycle of the present invention requires less time to execute than an equivalent I.S. cycle with comparable mechanism and forming times. The cycle of the present invention maintains required glass contact time while reducing blank mold and blow mold cycle times and increasing parison transfer time.

It can thus be seen that there has been provided a method and apparatus for making wide mouth hollow glass articles wherein the productivity and process stability is increased by using comparable forming times and mechanism times; maintaining required glass contact times and mechanism times while reducing the blank mold and blow mold cycle times and increasing parison transfer times; wherein the finish is held in the neck ring until the mold opens to prevent the bottle from pulling to one side and causing checks in the bottom and/or base of the neck; wherein machine speed is increased by using two neck rings to minimize parison transfer and reheat time appearing in the blank mold and blow mold cycles; wherein the parison reheat time can also be decreased while maintaining sufficient parison elongation; and wherein the blow mold can be located under the blank mold without altering the basic method.

We claim:

1. A method of forming a hollow glass article which comprises;

providing a blank mold having an open upper end, delivering a gob of glass to the blank mold, providing a first neck ring to a position adjacent the blank mold, forming the gob in the blank mold into a parison, providing a blow mold, moving the first neck ring relative to the blank mold toward the blow mold to transfer the parison to said blow mold, blowing the parison in the blow mold to form a hollow article, releasing engagement of the first neck ring from the hollow article, moving the first neck ring relative to the blow mold away from the blow mold, removing the hollow article from the blow mold, returning the first neck ring to a position adjacent to the blank mold to form another parison, providing a second neck ring adjacent the blank mold while the first neck ring is moving toward the blow mold, delivering a second gob of glass to the blank mold while the second neck ring is in position adjacent the blank mold, forming the second gob into a second parison, moving the second parison to a position adjacent the blow mold while the first neck ring is being returned to a position adjacent said blank mold, controlling the positioning and movement of the first neck ring and second neck ring independently of one another such that the velocity and movement of each neck ring is varied without affecting the overall forming cycle and such that a reheat and transfer time of each said parison on the first neck ring is controlled independently of each said parison on the second neck ring.

2. The method set forth in claim 1 wherein said step of forming each gob into a parison comprises introducing a plunger into said blank mold.

3. The method set forth in claim 2 wherein the step of delivering each first and second gob is performed while its respective first and second neck ring is in position adjacent the blank mold.

4. The method set forth in claim 3 wherein the step of delivering each said first and second gob is performed while its respective first and second neck ring is moving toward the blank mold.

5. The method set forth in claim 2 wherein said blank mold is moved from a lower to an upper position to engage the first neck rign or the second neck ring and a plunger is moved downwardly through the neck ring to form the first or second gob into a parison.

6. The method set forth in claim 5 wherein after forming of a gob into a parison the blank mold is moved to said lower position and the plunger is retracted.

7. The method set forth in claim 6 wherein the first or second neck ring with a parison thereon is moved downwardly into the blow mold, and the blow mold is closed about the parison, followed by providing a blow head and moving the blow head into position adjacent the blow mold for blow molding each parison.

8. The method set forth in any one of claims 1–7 wherein the step of providing a blank mold comprises providing a multiple cavity blank mold, the step of providing a blow mold comprises providing a multiple cavity blow mold, the step of providing a first neck ring comprises providing multiple first neck rings, and the step of providing a second neck ring comprises providing multiple second neck rings.

9. The method set forth in claim 7 wherein said blank mold is a multiple cavity blank mold which is provided at a first station and said blow mold is multiple cavity blow mold which is provided at a second station.

10. The method set forth in claim 9 including moving said multiple cavity blank mold upwardly and downwardly into and out of position for forming parisons.

11. An apparatus for forming a hollow glass articles which comprises;

a blank mold having an open upper end for delivering a gob of glass to said blank mold through said open upper end, a blow mold, a first neck ring, means for moving said first neck ring between a position adjacent the blank mold and a position adjacent said blow mold, means for forming the gob in the blank mold into a parison, a second neck ring, means for moving the second neck ring between a position adjacent the blank mold and a position adjacent the blow mold, means for removing a hollow article from the blow mold, means for controlling the means for moving said first neck ring and the means for moving said second neck ring independently of one another such that the velocity of movement of each of the neck rings is varied without affecting the forming cycle and so that a reheat and transfer time of a parison on the first neck ring is controlled independently of a parison on the second neck ring.

12. The apparatus set forth in claim 11 wherein said means for forming said gob in the blank mold into a parison comprises a plunger which moves through either the first neck ring or the second neck ring.

13. The apparatus set forth in claim 12 including means for moving said blank mold vertically upwardly into and out of position for forming said parison, and means for moving said blow mold into and out of position for blowing a hollow glass article.

14. The apparatus set forth in claim 13 including first means for moving said first neck ring horizontally between said blank mold and said blow mold and second means for moving said second neck ring horizontally between said blow mold and said blank mold.

15. The apparatus set forth in any one of claims 11–14 wherein said blank and blow mold comprise multicavity molds.

* * * * *